(No Model.)

D. H. DONALDSON.
SEWER TRAP.

No. 471,105.  Patented Mar. 22, 1892.

Witnesses.
J. M. Caldwell.
W. C. Shepard.

David H. Donaldson, Inventor.
By James Sangster
Attorney.

THE NORRIS PETERS CO., PHOTO-LITHO., WASHINGTON, D. C.

UNITED STATES PATENT OFFICE.

DAVID H. DONALDSON, OF BUFFALO, NEW YORK.

SEWER-TRAP.

SPECIFICATION forming part of Letters Patent No. 471,105, dated March 22, 1892.

Application filed April 6, 1891. Serial No. 387,814. (No model.)

*To all whom it may concern:*

Be it known that I, DAVID H. DONALDSON, a citizen of the United States, residing in Buffalo, in the county of Erie and State of New York, have invented certain new and useful Improvements in Sewer-Traps, of which the following is a specification.

The object of my invention is to produce a sewer-trap that will keep itself clear by the whirling action of the water as it passes through it without the aid of a valve of any kind, and is designed as an improvement on the trap for which I obtained a patent, No. 399,978, dated March 19, 1889, and will be fully and clearly hereinafter described and claimed, reference being had to the accompanying drawings, in which—

Figure 1:
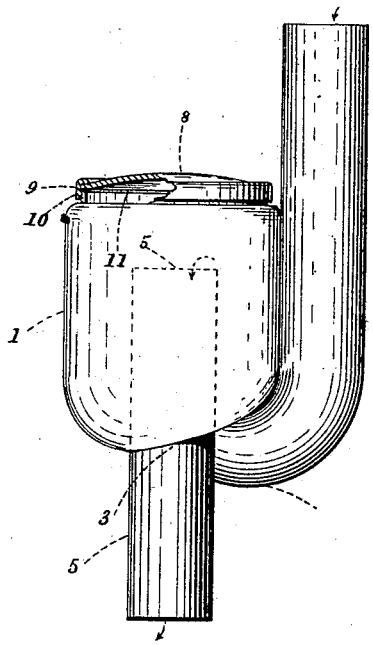
Figure 2:
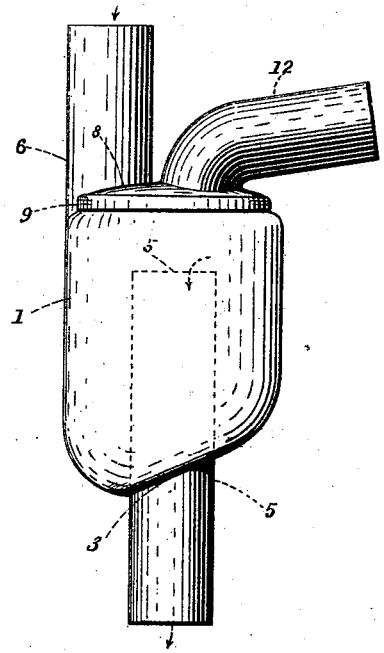
Figure 3:
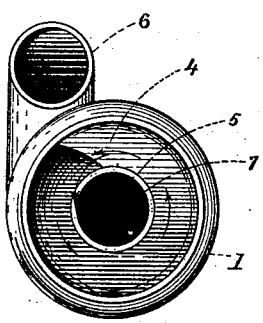

Figure 1 is a side elevation representing a portion of the cover in section, so as to show its interior construction. Fig. 2 is a front elevation showing a vent-pipe attached to the cover. Fig. 3 is a top plan view, the cover being removed, so as to expose the interior.

In said drawings, 1 represents the body of the trap. The lower portion of the body 1 is made in the form of a spiral 3, so as to form the spiral diaphragm 4 on the inside of the trap.

A vertical central outlet-pipe 5 extends up through the body of the trap to within a suitable distance of the top, leaving sufficient room between the top of the trap and pipe to allow a free circulation for the water and other matter as it enters the outlet-pipe 5.

The inlet-pipe 6 passes downward, then upward tangentially into the body of the trap, or enters at the periphery, so that the spiral diaphragm passes from the inlet-pipe around the vertical outlet-pipe, gradually rising as it does so, and thereby gives the water a clear unobstructed spiral passage-way from the circumference to the center, which sets it whirling around the outlet-opening as it passes out through it. The object of this construction is to present a free passage to anything that may enter the trap, such as pieces of lint or twine or other matter which gradually clogs and fills a trap of ordinary construction. By my construction such materials are set to whirling, and gradually rise until they reach the outlet-opening 7 and pass out, the motion of these materials and the liquid being in the direction of the arrows. There is no obstruction of any kind for materials to catch upon and clog the trap, and the rotation of the liquid brings everything to the center, over the outlet, when it passes through and out.

If anything should catch so as to hang over the top of the outlet-pipe, the circulation and lifting-power of the water would soon loosen it and lift it up to the mouth of the outlet and then down through it.

The top 8 is secured in place by means of a ring 9 and the screw portion 10. The top or cover 8 is put onto a rubber or other similar packing-ring 11 (see Fig. 1) and then the ring 9 screwed on, which brings the whole thing down in place air-tight and leaves an unobstructed open chamber above the outlet-opening.

If desired, an outlet or vent tube 12 may be rigidly secured to the cover or top 8, or formed in one piece with it, substantially as shown in Fig. 3.

In my former trap the inlet entered the body of the trap downward and in a direct radial line thereto, which caused the stream to strike the outlet-pipe in the center and downward. This necessarily checked the force of the stream and also necessitated the use of a separate curved piece of metal inclined to form a diaphragm or false bottom to give the water a start upward toward the top of the trap; but I have found that the use of the diaphragm was objectionable, as it made the trap more difficult and costly to make and also made more or less of an angle at that point, on which the refuse might catch and eventually clog the trap; but by making the inlet enter the trap tangentially and upward the use of the false bottom is dispensed with, and it is only necessary to form the lower portion of the inlet-pipe into an upward spiral and continue it around the outlet to form the bottom of the trap. In this way the inlet is always unobstructed, and the stream enters the trap with the full force, which will add materially to the efficiency of the trap.

I claim as my invention—

A sewer-trap consisting of a body or case, a central outlet the top of which is below the top of the case, whereby an open unobstructed chamber is formed above the outlet, and an inlet entering the case upwardly and at a tangent thereto, said inlet having its lower portion formed into a spiral and extended around the outlet to form the bottom of the trap, substantially as set forth.

DAVID H. DONALDSON.

Witnesses:
J. M. CALDWELL,
JAMES SANGSTER.